United States Patent
Cole et al.

(10) Patent No.: US 7,604,303 B2
(45) Date of Patent: Oct. 20, 2009

(54) PEDAL TRAVEL AUDIT SYSTEM

(75) Inventors: James A. Cole, Sterling Heights, MI (US); Kennedy U. Odumodu, Ann Arbor, MI (US); Richard E. Raymond, Algonac, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 282 days.

(21) Appl. No.: 11/622,607

(22) Filed: Jan. 12, 2007

(65) Prior Publication Data

US 2008/0169699 A1    Jul. 17, 2008

(51) Int. Cl.
*B60T 17/04* (2006.01)
(52) U.S. Cl. .......................................... 303/191; 303/20
(58) Field of Classification Search ............... 303/3, 303/20, 191; 74/512; 188/1.11 E
See application file for complete search history.

(56) References Cited

U.S. PATENT DOCUMENTS

| 5,217,280 | A | * | 6/1993 | Nykerk et al. | ............ 303/3 |
| 6,006,868 | A | | 12/1999 | Klink | |
| 6,474,753 | B1 | * | 11/2002 | Rieth et al. | ............ 303/191 |
| 2003/0067215 | A1 | * | 4/2003 | Rieth et al. | ............ 303/20 |
| 2006/0230869 | A1 | * | 10/2006 | Cosby et al. | ............ 74/512 |

* cited by examiner

*Primary Examiner*—Christopher P Schwartz

(57) ABSTRACT

A pedal travel audit assembly adapted for measuring the applied force to and resultant pedal travel of a brake pedal includes first and second sensors and an electronic control unit, wherein the second sensor is configured to wirelessly detect the relative distance between the pedal and a remaining structure spaced from and unsupportive of the pedal, and the electronic control unit is configured to cause an output relative to the distance to be generated.

3 Claims, 2 Drawing Sheets

(A-A)

PEDAL TRAVEL AUDIT SYSTEM

TECHNICAL FIELD

The present invention relates to brake pedal translation sensors, and more particularly, to a pedal travel audit assembly including a sensor adapted for measuring the relative distance between the brake pedal and a remaining structure of a vehicle, wherein the sensor is spaced from and configured to wirelessly detect the remaining structure.

BACKGROUND OF THE INVENTION

Vehicular braking systems have been developed to perform the indispensable tasks of slowing and stopping a vehicle when moving. With respect to automobiles, these systems include a braking pedal, and a plurality of brake pads fluidly coupled and responsive to the pedal. The pads are positioned and oriented to engage the vehicle wheels, so as to increase the rate of deceleration caused by friction. Typically, the pads are hydraulically coupled to the pedal, so that the force applied to push the pedal is transferred proportionally to each pad by the pressurized incompressible fluid. The incompressibility of the fluid, however, results in an increase in resistive force to the pedal as it is pushed, thereby requiring a steadily increasing applied force.

Audit systems have been developed in conventional factory and manufacturing settings to verify pedal force and pedal travel. These audit systems formally employed a tester, usually a human worker, who manually pushed the brake pedal of each unit or vehicle, and observed the pedal travel distance resulting from the applied force. The tester relied on his personal observation and experience to determine compliance. Conventional audit systems have incorporated load cells to quantitatively determine the applied force, and various distance sensors, such as linear displacement, accelerometer type, and inclinometer type sensors, for objectively detecting the travel distance of the brake pedal. These conventional systems, however, present concerns relating to their determination of pedal travel, in that they are attached to and rely upon the braking system support structure to operate, and more particularly, are susceptible to erroneous distance and compliance determinations caused by deflections in the structure.

Thus, there is a need in the manufacturing arts for an improved system for and method of auditing a braking system that utilizes objective means for determining pedal travel, and that is not susceptible to erroneous compliance conclusions caused by internal deflections.

SUMMARY OF THE INVENTION

Responsive to these and other concerns presented by conventional audit systems the present invention presents an improved pedal travel audit assembly including a wireless sensor able to detect the relative distance between the brake pedal and a remaining structure of the vehicle. Among other things, the invention is useful for providing an objective means of verifying an acceptable level of brake pedal travel and hardness, which assures that only unacceptable levels result in a vehicle being sent to repair. The invention is also useful for providing accurate and repeatable distance measurement with virtually no sensor setup required between vehicle to vehicle.

A first aspect of the present invention generally concerns an apparatus adapted for use with a vehicle having a brake pedal and fixed structure, and for determining a relative distance between the pedal and structure. The apparatus comprises an engaging bracket fixedly attachable to the pedal, and a sensor fixedly connected to the bracket, and communicatively coupled to an electronic control unit. The sensor is spaced from the structure, and configured to wirelessly detect a relative distance between the sensor and structure, when the bracket is attached to the pedal; and the unit is configured to cause an output based on the relative distance to be generated.

A second aspect of the present invention further includes a second sensor operable to concurrently measure an applied force to the brake pedal. The unit is configured to determine a force/correlative distance combination, and cause an output to be generated based on the force and correlative distance combination.

Another aspect of the present invention concerns a method of auditing a brake system of a vehicle, wherein the vehicle includes a translatable brake pedal, and a remaining fixed structure spaced from the pedal. The method includes the steps of securing first and second sensors in a fixed position relative to the pedal and spacing the second sensor from the structure. A plurality of differing forces are applied to the first sensor, wherein each force causes the pedal to translate a correlative differing distance, so as to determine a plurality of correlative distances, and force/distance combinations. The plurality of forces are measured by the first sensor, and the plurality of correlative distances are detected by the second sensor. Next, a trend or line-graph based on the pluralities of forces and distances is determined, and compared to a reference, so as to determine a compliance status.

Thus, it will be appreciated and understood that the present invention provides a number of improvements and advantages over the prior art, including providing an apparatus and assembly easier to setup and use. It is also appreciated that the inventive apparatus and assembly is less expensive to make and/or use than similar commercially available units. Finally, spacing the sensor from and basing relative distance determination on a remaining fixed structure of the vehicle negates the effects of bracket, instrument panel (IP), and plenum deflection common to conventional audit systems.

The aforementioned aspects, features, and/or species of the present invention are discussed in greater detail in the section below titled DESCRIPTION OF THE PREFERRED EMBODIMENT(S).

BRIEF DESCRIPTION OF THE DRAWINGS

Preferred embodiments of the invention are described in detail below with reference to the attached drawing figures, wherein:

FIG. 3 is an elevation view of an assembly in accordance with a preferred embodiment of the present invention, a brake pedal, and an accelerator pedal, particularly illustrating the first and second sensors communicatively coupled to a display, and generated outputs shown on the display;

FIG. 3a is a cross-section of a brake pedal and bracket taken along the line A-A in FIG. 3, particularly illustrating the relative dimensioning there between;

DESCRIPTION OF THE PREFERRED EMBODIMENT(S)

Figure 1:
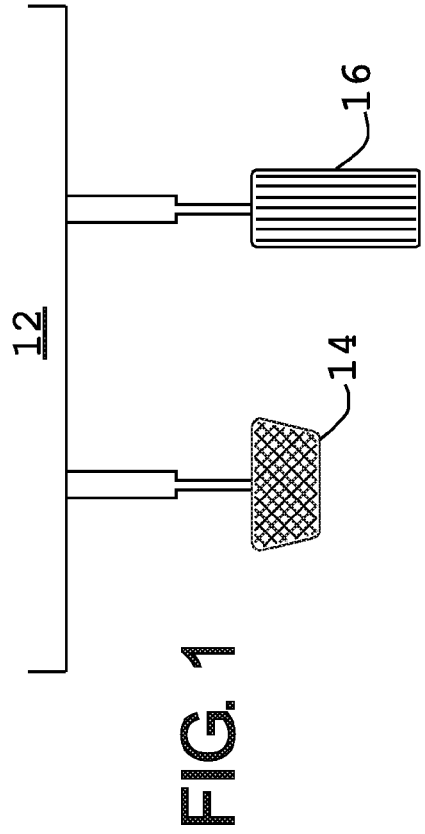
FIG. 1 is an elevation view of the brake and accelerator pedals of a vehicle.

The present invention concerns an improved pedal travel audit assembly 10 adapted for use with a vehicle 12 having a translatable brake pedal 14, and remaining structure 16 spaced from the pedal 14. As further described herein, the assembly 10 is operable for use by a human or robotic operator 18 in an automotive factory, manufacturing, or after-market repair process or facility. However, it is appreciated by those of ordinary skill in the art that the assembly 10 may be utilized in other implementations wherein detection of a force and wireless detection of a relative distance between a target and a fixed object resulting from the force are concurrently desired.

The structure 16 and brake pedal 14 are cooperatively configured such that the structure 16 does not provide support to the pedal 14, and as such, does not experience a transfer of force from the pedal 14, during engagement by the operator 18. During an audit, the structure 16 therefore remains absolutely fixed, and will henceforth be described as a remaining fixed structure 16. However, it is appreciated that the structure 16 may itself be translatable or pivotable in separate operation. For example, in the illustrated embodiment of the present invention, the structure 16 is the accelerator pedal of the vehicle 12, due to its typical proximity to the brake pedal 14 (see FIGS. 1 through 3).

In general, the assembly 10 is configured to measure an applied force to the brake pedal 14, and determine the resultant pedal travel. The preferred assembly 10 includes a plurality of sensors cooperatively configured to engage the pedal 14, measure the force, and wirelessly detect a relative distance between the pedal 14 and the structure 16. The preferred assembly 10 is further configured to cause an output, such as indicia (e.g., numerical representations of the force and distance), or a warning to be generated that alerts the operator of a non-compliant measurement (see FIG. 3).

Figure 3A:
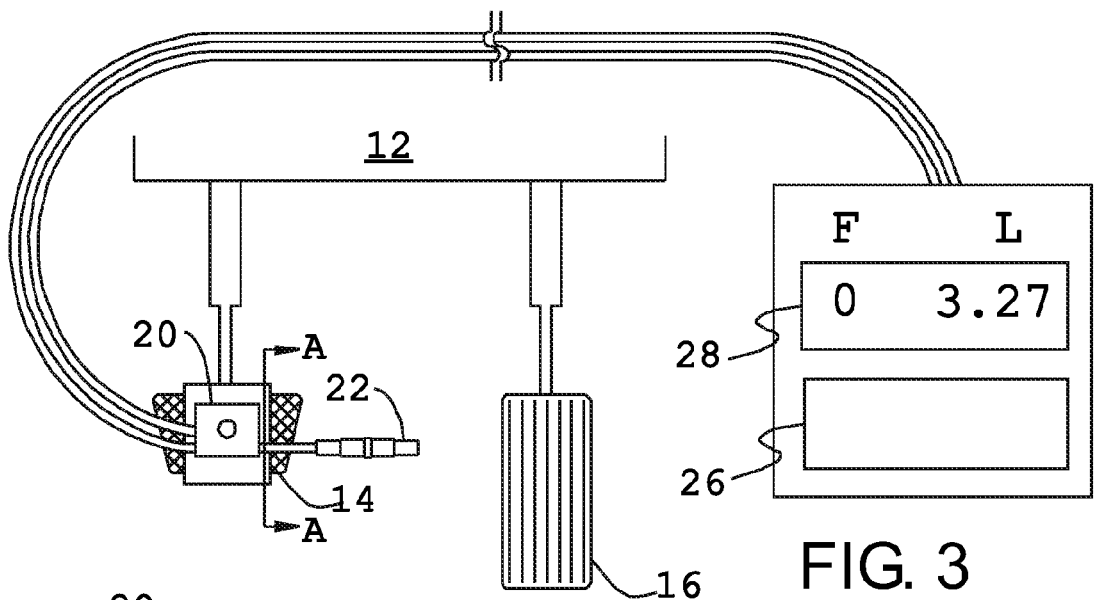
Figure 3A:
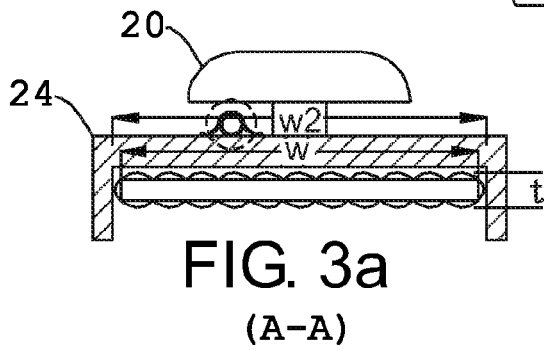

More particular, the assembly 10 includes a first sensor 20 for measuring the force applied to the brake pedal 14, and a second sensor 22 for wirelessly detecting the relative distance between the brake pedal 14 and the fixed structure 16. The first and second sensors 20,22 are secured to the brake pedal by a removable bracket 24, so that the assembly 10 is readily installable, and removable, thereby facilitating its use with a large plurality of vehicles in an assembly line process. An electronic control unit (ECU) 26 is communicatively coupled to the first and second sensors 20,22, is configured to convert their signals to force and distance values, and preferably causes an indicia output to be generated on a display 28. For example, as shown in FIG. 3, where the force sensor 20 and pedal 14 are not engaged, a force measurement of "0" is displayed, and the correlative no-force relative distance (e.g., "3.27"), is also displayed.

The ECU 26 is further configured to compare the force/distance combination to a previously entered force/distance matrix of acceptable combinations, and further cause a warning output or alarm to be generated, when the applied force causes a resultant relative distance greater than the acceptable distance for the given force. The ECU 26 is described herein as a single unit, however, it is certainly within the ambit of the invention to include separate component sensor circuitry configured to perform the described individual sensor algorithms, and integrate the component units with the particular sensor, such that the ECU 26 consists of multiple component units.

Figure 3B:
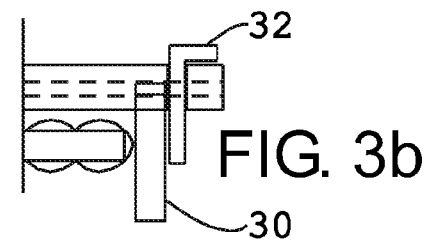
FIG. 3b is a cross-sectional segment of an adjustable bracket in accordance with a preferred embodiment of the present invention, particularly illustrating an adjustable wall slidably coupled to a track, and a pin for securing the wall relative to the pedal.

The preferred bracket 24 is cooperatively dimensioned with the pedal 14, so as to snuggly slide over the brake pedal 14, which typically presents a compressive outer layer of material. For example, as shown in FIG. 3a, where the pedal 14 presents an engaging surface width, $w_1$, as orthogonally measured across the surface, and a thickness, t, as measured perpendicularly to the surface, the bracket 24 preferably presents a slot opening having a width, $w_2$, greater than or equal to 105% of $w_1$, and a depth, d, equal to or greater than 105% of t, so as to snuggly slide the pedal intermediately therein. More preferably, and as shown in FIG. 3b, the bracket 24 presents an adjustable wall 30, and slot opening, so as to enable its use with a variety of pedal configurations. As illustrated, the wall 30 may slide within a track, and the bracket 24 may further include a holding mechanism 32, such as a pin, bolt or lever, for securing the wall 30 in place.

Figure 2:
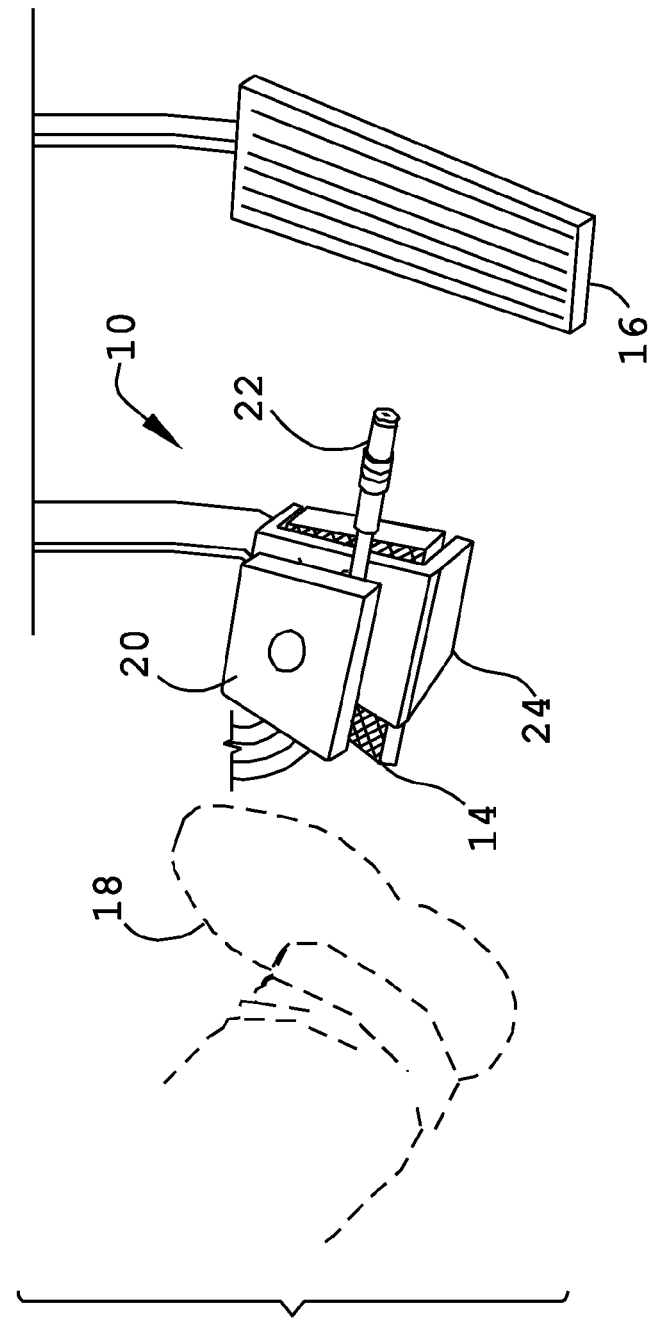
FIG. 2 is a perspective view of an assembly in accordance with the present invention, wherein a load cell, and ultrasonic sensor are removably coupled to the brake pedal, and the ultrasonic sensor is spaced from the accelerator pedal, and the foot of a human operator (in hidden-line type) prepares to push the brake pedal.

The first sensor 20 preferably includes a load cell that is preferably coupled by hard-wire to the ECU 26. As is typical, the load cell includes a force transducer configured to convert force or applied load to an electrical voltage signal. As shown in FIG. 2, the force sensor 20 preferably presents an engaging surface sufficient in surface area and oriented to facilitate the application of the force typically by a foot of a human operator 18. The preferred force sensor 20 and ECU 26 are further configured to measure the change in force and displacement, by taking a plurality of force measurements over a period. To guard against excessive "hardness," the preferred first sensor 20 and ECU 26 are also configured to compare the applied force (necessary for initial pedal translation) to a pre-entered force threshold.

As previously described, the second sensor 22 includes wireless detection means for determining a range or relative distance between the brake and accelerator pedals 14,16 at conventional spacings. Thus, the second sensor 22 preferably includes an operating range of 7 to 25 cm (i.e., aprx. 3 to 10 inches), and more preferably 4 to 35 cm (i.e., aprx. 1.6 to 13.8 inches).

Figure 4:
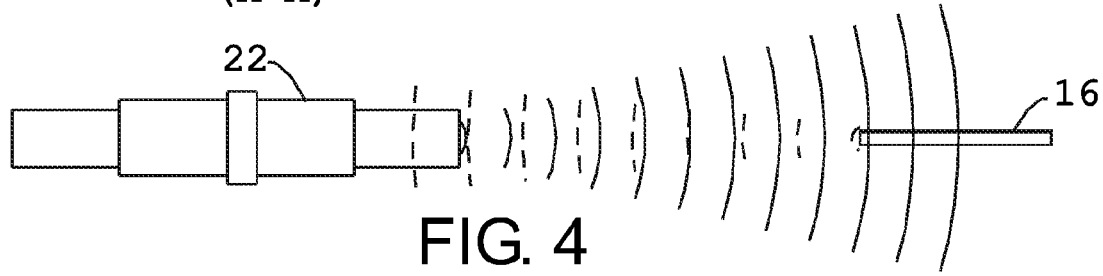
FIG. 4 is a bottom view of the ultrasonic sensor and accelerator pedal during operation, particularly showing the transmission of a pulse wave to, and the receipt of an echo (in hidden line-type) from the accelerator pedal.

As shown in FIG. 4, the preferred second sensor 22 employs ultrasonic technology, and as such, is configured to transmit a pulse wave from a transmitter (not shown) to the accelerator pedal 16, and receive an echo of this wave from the accelerator pedal 16 to a receiver (also not shown). In the illustrated embodiment, the ultrasonic sensor 22 is oriented and positioned to transmit the pulse wave towards the edge of the accelerator pedal 16. More preferably, however, the ultrasonic sensor 22 may be positioned and oriented to project its pulse wave towards the engaging surface of the pedal 16 rather than towards its edge. It is appreciated, and known in the art to utilize a single transducer for transmission of the wave, and receipt of the echo. Finally, the ultrasonic sensor 22 and ECU 26 are cooperatively configured to determine the total elapsed time of transmission and receipt, and convert this time to the relative distance based on the speed of sound.

It is within the ambit of the invention for other wireless technology such as infrared, laser, or another suitable technology to be utilized by the second sensor 22, provided that the technology is capable of narrowly detecting, while being entirely disconnected from, the structure 16.

Figure 5:
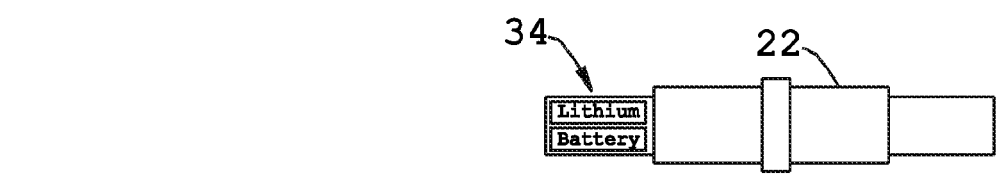
FIG. 5 is an elevation view of a preferred embodiment of the ultrasonic sensor, wherein two lithium batteries function as an internal power source.
Figure 6:
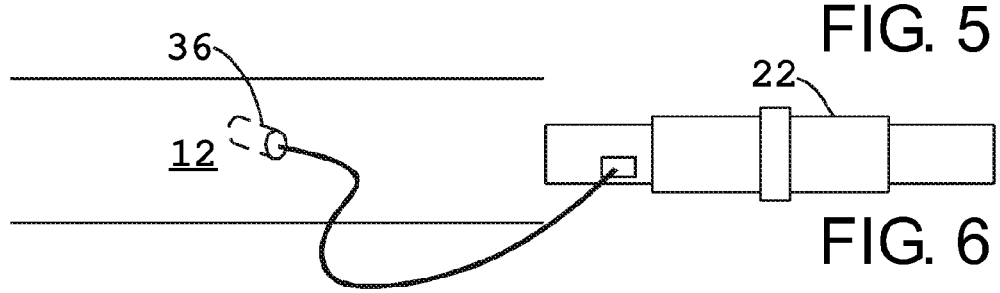
FIG. 6 is an elevation view of a second preferred embodiment of an ultrasonic sensor having an auxiliary power adapter for connecting to the auxiliary power receptacle of a vehicle (not shown), so as to be externally powered by the vehicle's battery (not shown).

As shown in FIG. 5, the second sensor 22 is preferably powered by an internal power source 34 (e.g., two lithium AA batteries). Alternatively, sensor 22 may be adapted for use with an external power source. For example, the sensor 22 may include an auxiliary power adapter 36 configured to connect the sensor 22 to the battery of the vehicle 12, as shown in FIG. 6. In yet another alternative, the ECU 26 may contain the internal power source or be adapted for connecting to an external power source, so as to power both the sensors 20,22 and the display 28.

In operation, the ultrasonic sensor 22 presents a frequency and beam pattern that results in sufficient resolution to detect a change in relative pedal movement preferably equal to or less than 0.025 cm (i.e., 0.01 inches). Because the sensor 22 will detect the closest object within its beam pattern that reflects ultrasound, it is appreciated that the total beam pattern of the sensor 22 should be as narrow as possible, while maintaining sufficient operating range. As such, it is further appreciated that relatively high frequency (e.g., 300 kHz) ultrasonic sensors provide the preferred resolution and beam patterns for use with the present invention.

It is appreciated that various external factors affect the performance of the ultrasonic sensor 22 and should be considered. For example, among the factors that affect the speed of sound in air is humidity. In this regard, the assembly 10 preferably includes a humidity sensor (not shown), and the ECU 26 is configured to alter its calculations based upon the current humidity. More preferably, audits are performed in a controlled space environment where humidity remains at predetermined algorithm levels. Another factor is temperature. Here, also, the assembly 10 preferably includes a thermometer (also not shown), and the ECU 26 is configured to alter its calculations or algorithm based upon the current temperature. More preferably, audits are performed in a controlled space wherein temperature remains within a predetermined algorithm range.

The following methods of performing an audit in accordance with the present invention further illustrate the functionality of the inventive assembly 10, wherein a first preferred method includes securing the first and second sensors 20,22 in fixed positions relative to the braking pedal 14, and spacing the second sensor from the structure 16. Next, a normal force is applied to the first sensor 20 and pedal 14, such that the force causes the pedal 14 to translate. The relative distance from the structure 16 is detected by the second sensor 22, and force/distance values are determined by the ECU 26. Finally, the correlative values are compared to a reference matrix, so as to determine the compliance status of the brake system.

A second preferred method of auditing a braking system of a vehicle, in accordance with the present invention further includes detecting an initial no-force relative distance between the pedal 14 and structure 16 prior to applying the normal force. A brake pedal actual displacement value is determined by the ECU 26 by triangulating the initial and applied force relative distances detected by the second sensor 22, and the correlative force and displacement values are compared to a displacement reference matrix.

A third preferred method of auditing a braking system, modified from the first method in accordance with the present invention further includes applying a plurality of differing normal forces to the first sensor 20 and pedal 14, such that each force causes the pedal 14 to translate a correlative differing distance from the structure 16. The plurality of correlative distances are detected by the second sensor 22, and a plurality of force/distance value combinations are determined by the ECU 26. Finally, a trend (e.g., line-graph) defined by the combinations is generated, and compared to a reference. It is appreciated that determining the trend between successive force samples enables review of the change in performance of a braking system from one sample force to the next (e.g., between first and second pumps of the brake pedal), as opposed to a snap shot review of a particular sample force/distance combinations.

The preferred forms of the invention described above are to be used as illustration only, and should not be utilized in a limiting sense in interpreting the scope of the general inventive concept. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A method of auditing a brake system of a vehicle, wherein said vehicle includes a translatable brake pedal, and a remaining fixed structure spaced from the pedal, said method comprising the steps of:
   a. securing first and second sensors in a fixed position relative to the pedal and spacing the second sensor from the structure, wherein the first sensor is configured to measure a force applied to the pedal, and the second sensor is configured to detect a relative distance between the pedal and structure;
   b. applying a plurality of differing forces to the first sensor, wherein each force causes the pedal to translate a correlative differing distance, so as to determine a plurality of correlative distances, and force/distance combinations;
   c. measuring said plurality of forces with the first sensor, and detecting said plurality of correlative distances with the second sensor;
   d. generating a trend based on the pluralities of forces and distances; and
   e. comparing the trend to a reference, so as to determine a compliance status.

2. The method as claimed in claim 1, steps (a) through (d) further including the steps of determining an initial no-force relative distance prior to applying the force, an actual pedal displacement based on the initial and applied-force distances, for each of the plurality of forces, so as to determine a plurality of displacements, and generating a line-graph based on the pluralities of forces and displacements.

3. The method as claimed in claim 1, wherein said reference includes a preferred force/distance matrix.

* * * * *